(12) United States Patent
Ross (10) Patent No.: US 6,400,725 B1
(45) Date of Patent: Jun. 4, 2002

(54) FAIRNESS SCHEME FOR A SERIAL INTERFACE

(75) Inventor: Kevin Ross, Sunnyvale, CA (US)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/212,626

(22) Filed: Dec. 16, 1998

(51) Int. Cl.[7] ............................................. H04L 12/413
(52) U.S. Cl. ........................ 370/445; 370/458; 370/462
(58) Field of Search ................................. 370/445, 446, 370/447, 448, 257, 438, 338, 229, 230, 458, 459, 461, 462

(56) References Cited

U.S. PATENT DOCUMENTS

| | | | |
|---|---|---|---|
| 4,677,612 A | * 6/1987 | Olson et al. | 370/445 |
| 4,706,246 A | * 11/1987 | Kume | 370/445 |
| 4,707,829 A | * 11/1987 | Pendse | 370/445 |
| 4,888,765 A | 12/1989 | Dyke | 370/95.1 |
| 5,175,537 A | * 12/1992 | Jaffe et al. | 370/447 |
| 5,229,993 A | * 7/1993 | Foudriat et al. | 370/445 |
| 5,265,094 A | * 11/1993 | Schmickler et al. | 370/447 |
| 5,488,711 A | 1/1996 | Hewitt et al. | 395/430 |
| 5,576,702 A | * 11/1996 | Samoylenko | 370/447 |

FOREIGN PATENT DOCUMENTS

| | | |
|---|---|---|
| EP | 0216379 A2 | 4/1987 |
| WO | 9745984 A1 | 12/1997 |

* cited by examiner

*Primary Examiner*—Ricky Ngo
*Assistant Examiner*—Phuc Tran
(74) *Attorney, Agent, or Firm*—Steven R. Biren (57) ABSTRACT

To maximize the throughput and minimize the latency associated with communications among devices on a single channel communications system, this invention provides a method and apparatus for a fairness based protocol that assures each device an equal opportunity to access the single channel communications system. The protocol forces a "fairness" delay between each sequential transmission from a device, thereby allowing another device to gain access to the communications channel during this fairness delay period. In a preferred embodiment, the duration of each transmission is limited, thereby providing a maximum latency period for a device to gain access to the communications channel, and a minimum bandwidth allocation to the device. By providing a protocol having a guaranteed minimum bandwidth and maximum latency, a device in accordance with this invention need only contain the storage resources needed for the latency period.

15 Claims, 5 Drawing Sheets

FAIRNESS SCHEME FOR A SERIAL INTERFACE

BACKGROUND OF THE INVENTION

1. Field of the Invention

This invention relates to the field of communications, and in particular to the field of data communications among devices via a single channel path.

2. Description of Related Art

The use of a serial interface between components is often preferable to a parallel interface. The use of a serial interface for communicating data can provide for significant cost savings. The cost of the media to carry the serial information is less than that of a parallel interface. If a wired connection is used, fewer wires and simpler connectors are required between the devices; if a wireless connection is used, fewer channels are required between the devices. The communicating devices will also be less costly because the interconnection ports, such as pads on an integrated circuit or pins on a printed circuit board, are often more costly than the circuitry required to convert data between parallel and serial forms. And, particularly in integrated circuit design, the number of available interconnection ports is often a fixed constraint, from both a cost and feasibility viewpoint. Typically, to achieve the benefits of a serial interface, a single channel communications path is allocated for communications to and from each device.

A common protocol that is used for single channel communications is a "collision avoidance" protocol. When a device has information to send, it waits for a quiet period on the communications channel, then broadcasts its information. By waiting until the channel is unused before communicating, one device does not purposely interfere with another device that is already using the single communications channel. However, in this protocol, it is possible that two devices may each monitor the channel, detect a quiet period, and then each start their respective transmission on the single channel. Two (or more) simultaneous transmissions on a single channel is termed a "collision", and neither transmission will be recoverable at their intended receiver. To compensate for the likelihood of collisions, typical protocols provide for a collision recovery scheme. Traditionally, the protocol requires that each transmitter monitor the channel to detect a collision and take appropriate action when a collision is detected. Typically, the appropriate action is to cease transmission (commonly termed "back off"), then recommence transmission at the next detected quiet period. To avoid repeated collisions between the same devices after a collision, the protocol typically requires that each device attempt a retransmission after a random duration of the quiet period. In this manner, the device having the shorter random duration will commence transmission and the device with the longer random duration will detect this transmission and wait until the next quiet period.

The collision detection—back off—retransmit scenario is particularly problematic to high speed peripheral devices such as magnetic disks, CDs, and the like. Typically, the peripheral has access to the data at particular times, such as when the appropriate area of a spinning disk is under the read head of the device. If the data cannot be communicated when the data is available for access, the peripheral device must contain a storage buffer to hold the data until it can be transmitted, or loose a revolution, thereby reducing the transfer rate. Additional collisions, or additional delays incurred while awaiting a retransmission opportunity, will require additional storage buffers, or a cessation of data access until buffer space becomes available. Also, because of the random nature of collisions and the aforementioned dependency on traffic volume, it is difficult to assure a given throughput without providing an overabundance of storage. That is, to assure a given throughput regardless of the impact of collisions, the amount of storage provided must be sufficient to buffer the effects of the worst-case collision scenario; consequently, during normal operations, with average occurrences of collisions, most of the storage provided for collision compensation will be unused.

Another problem with the collision avoidance scenario is that a device may be precluded access to the single channel for extended durations while other devices transmit on the single channel. This is particularly problematic if data flow is controlled via communications on the single channel. For example, one device may have a limited buffer for receiving data from another device, and may be configured to transmit a "cease transmission" signal to the sending device to prevent a buffer overflow. If the receiving device cannot gain access to the single channel because the transmitting device continues to gain access to the single channel before the receiving device, the transmitting device will continue to transmit, and overflow the receiver's buffer.

BRIEF SUMMARY OF THE INVENTION

It is an object of this invention to provide a method and apparatus for communications on a single channel that provides an equal likelihood of access to the communications channel to each device utilizing the channel. It is a further object of this invention to provide a minimum bandwidth allocation to each device utilizing the channel. It is a further object of this invention to provide a maximum latency delay to each device utilizing the channel.

These objects and others are achieved by providing a commnunications protocol that forces a "fairness" delay between each sequential transmission from a device, thereby allowing another device to gain access to the communications channel during this fairness delay period. In a preferred embodiment, the duration of each transmission is also limited, thereby providing a maximum latency period for a device to gain access to the communications channel, and a minimum bandwidth allocation to the device. By providing a protocol having a guaranteed minimum bandwidth and maximum latency, a device in accordance with this invention need only contain the storage resources needed for the latency period.

BRIEF DESCRIPTION OF THE DRAWINGS

The invention is explained in further detail, and by way of example, with reference to the accompanying drawings wherein.

DETAILED DESCRIPTION OF THE INVENTION

Figure 1:
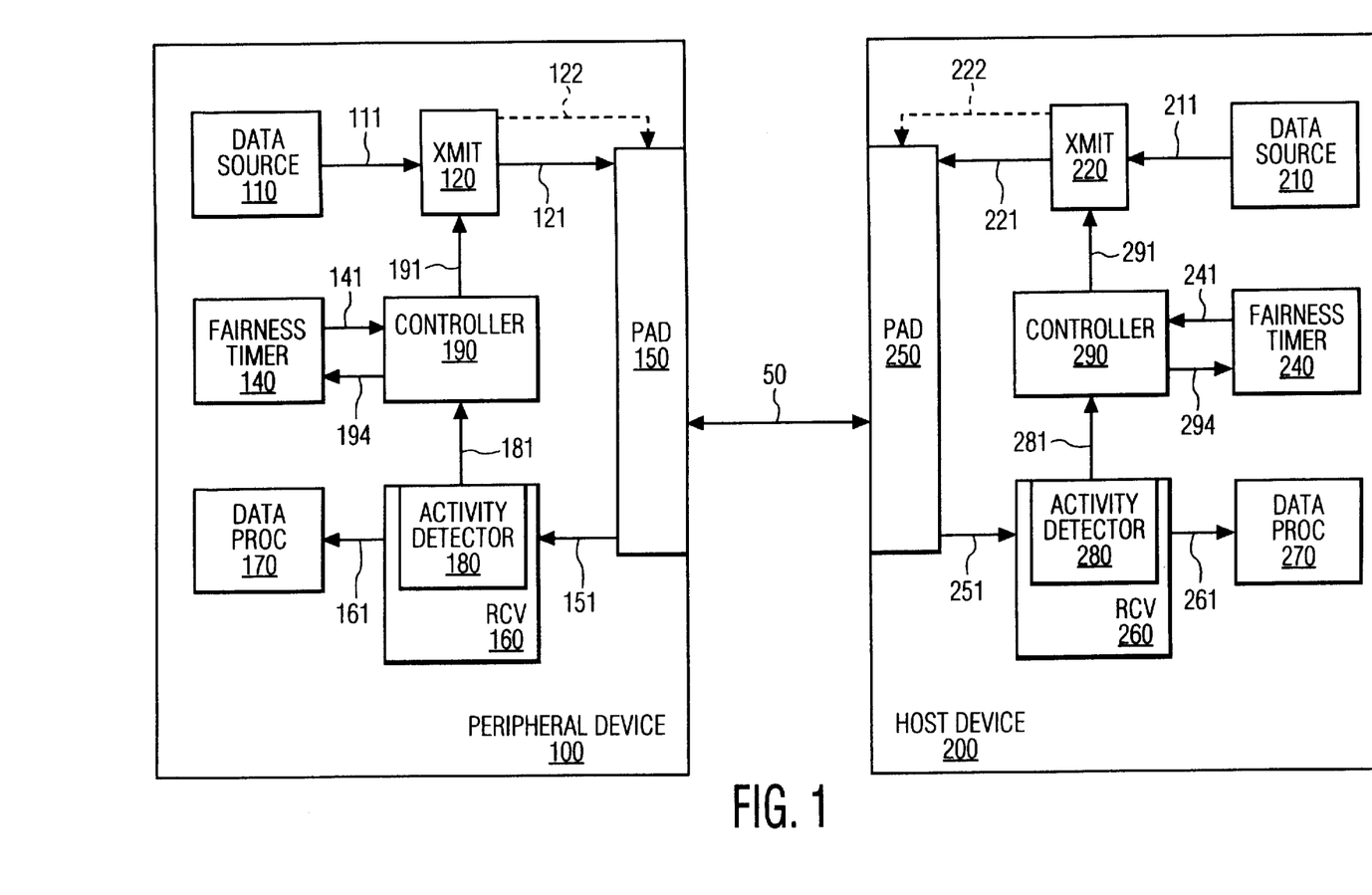
FIG. 1 illustrates an example block diagram of a two station communications system in accordance with this invention.

FIG. 1 illustrates an example block diagram of a two station communications system in accordance with this invention. For ease of reference, a host-peripheral paradigm is used to distinguish the stations of the two station system. Illustrated in this system is a peripheral device 100 and a host device 200 that communicate with each other via a single channel communications path 50. It will be evident to one of ordinary art, however, that the principles presented herein can be applied to communicating devices in general that use a common communications path for transmitting and receiving.

The single channel communications path 50 may be via a wired or wireless communications media or combinations of media. The single channel communications path 50, as its name implies, is limited to transmissions from only one device at any point in time. Multiple signals may be transmitted simultaneously via this communications path 50, such as clock and data signals on separate wires, but from only one device at a time. In the illustrated system of FIG. 1, if both devices 100, 200 attempt to transmit during the same time interval, neither device 100, 200 will be able to correctly receive the transmitted information from the other during that time interval.

The example peripheral device 100 of FIG. 1 includes a data source 110 and a transmitter for communicating data 111 from the source 110 to the host device 200. The transmitter 120 also effects any transformations of the data required for transmission, such as conversion from parallel to serial form, conversion to a modulated form, and the like. The transformed data 121 from the transmitter 120 is communicated to the communications path 50 via a pad 150, for example an input/output pad of an integrated circuit. As would be evident to one of ordinary skill in the art, if the communications path 50 is via a wireless media, the pad 150 represents the components used to effect the transmission via this media, such as an RF antenna, a sonic transducer, an infrared transducer, and the like. Illustrated in FIG. 1 is an optional transmit-disable signal 122 that is used in a preferred embodiment to isolate the transmitter 120 from the communications path 50 and the receiver 160 when signals are being received from the host 200.

The example host device 200 of FIG. 1 includes a corresponding pad 250 that receives the transformed data 121 via the path 50 and provides a received signal 251 to a receiver 260. The pad 250 and receiver 260 effect a transformation of the transformed data 121 on path 50 into data 261 that corresponds to the original data 111. For example, if the communications path 50 is via an RF transmission, the pad 250 and receiver 260 receive the RF modulation of the original data 111 and demodulate it to form the data 261. The data 261 is provided to the data processor 270 for subsequent processing, for example for processing by an application program that is executing on the host device 200. The host device 200 also includes an optional transmit-disable signal 222 that is used in a preferred embodiment to isolate the transmitter 220 from the communications path 50 and receiver 260 when signals may be received from the peripheral device 100. The receiver 260 includes an activity detector 280 that provides an activity signal 281 whenever transmissions from the peripheral device 100 are detected.

In like manner, the example host device 200 also includes a data source 210 and a transmitter 220 for communicating data 211 from the source 210 to the peripheral device 100. The transmitter 220 transforms the data 211 to a form 221 suitable for transmission, as discussed above with regard to transmitter 120. The transformed data 221 from the transmitter 220 is communicated to the communications path 50 via a pad 250. Correspondingly, the example peripheral device 100 receives the signal on the communications path 50 via the pad 150 and provides a received signal 151 to a receiver 160. The pad 150 and receiver 160 effect a transformation of the host transmission signal into data 161 that corresponds to the host data 211. In the example of the peripheral device 100 being a disk drive, the data processor 170 may merely store the data 161 from the receiver 160 to the data source 110 for subsequent access as data 111. The receiver 160 includes an activity detector 180 that asserts an activity signal 181 whenever a signal is received from the host device 200.

Figure 2:
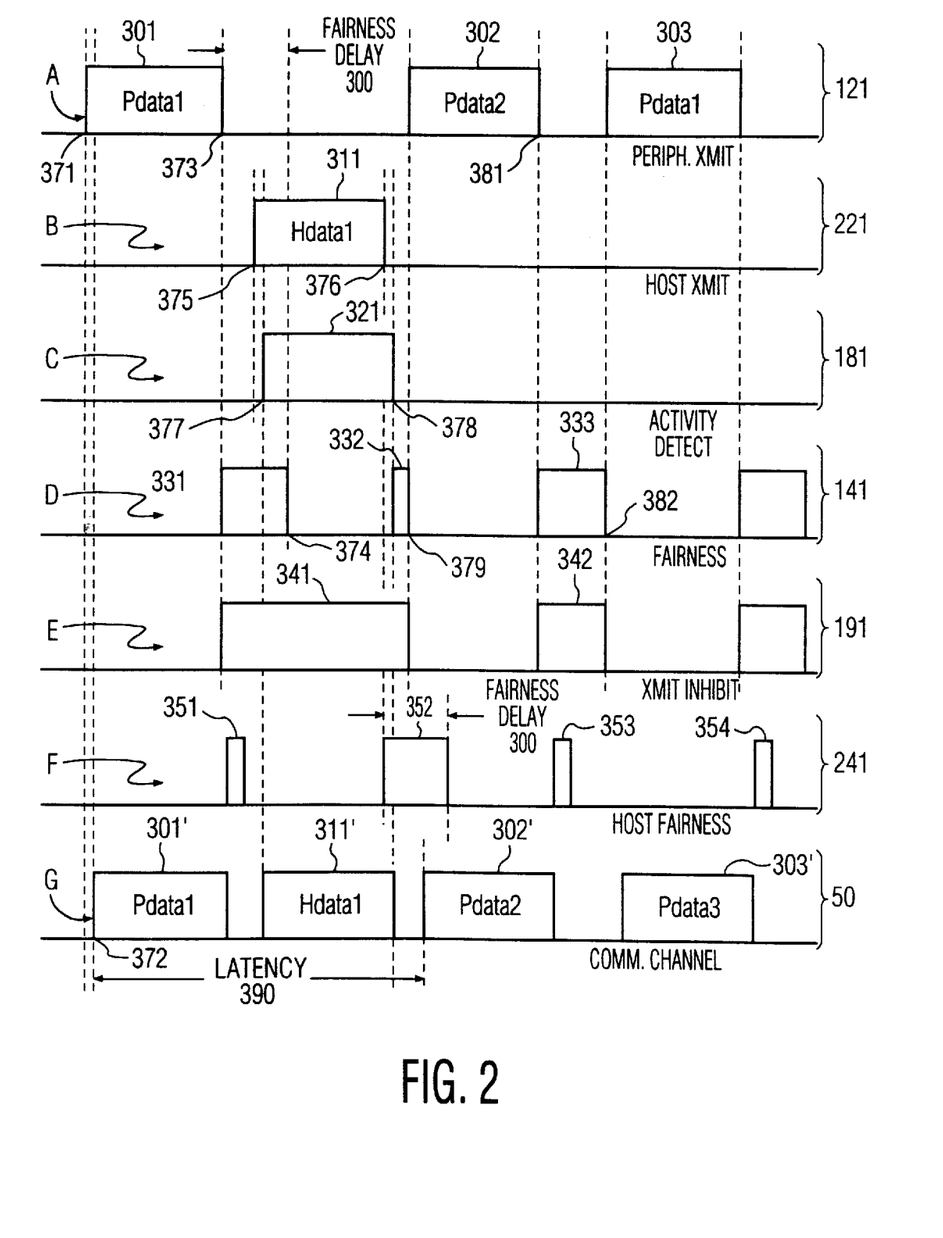
FIG. 2 illustrates example timing diagrams of a two station communications system in accordance with this invention.

The peripheral device 100 includes a fairness timer 140 and a controller 190; and the host device 200 includes a fairness timer 240 and a controller 290, the operation of which are best understood with respect to the timing diagrams of FIG. 2. Timing diagram A of FIG. 2 corresponds to the peripheral transmission signal 121 of the peripheral device 100 of FIG. 1, and illustrates a sequence of transmissions 301, 302, 303 from the peripheral device 100. Timing diagram B corresponds to the host transmission signal 221, and illustrates a transmission 311 from the host device 200. Timing diagrams C, D, E, and F correspond to signals 181, 141, 191, and 241 respectively, and timing diagram G illustrates transmissions as they occur on the communications path 50.

The peripheral device 100 transmits the first transmission 301 of the sequence at time 371; a short time later at 372, the transmission 301 propagates to the communications path 50, as illustrated by signal 301 on timing diagram G. The transmission 301 ends at time 373. In accordance with this invention, the controller 190 asserts a timing request 194 to the fairness timer 140 at the end of each transmission from the transmitter 120. In response to this timing request 194, the fairness timer 140 asserts a fairness signal 141 for a predetermined duration, hereinafter termed a fairness delay period 300. As illustrated in FIG. 2, at the end 373 of the transmission 301, a fairness pulse 331 is asserted for a duration equal to the fairness delay 300.

The fairness delay period 300 is provided in accordance with this invention in order to allow the host device 200 access to the single channel communications path 50. The duration of the fairness period 300 is sufficient to allow the host device 200 to detect, via the activity detector 280, the end of each transmission 121 from the peripheral device 100, and to initiate a host transmission 221 from the host transmitter 220. The duration of the fairness period 300 is also sufficient to allow the peripheral device 100 to detect the initiation of the transmission 221 from the host 200, so that the peripheral device 100 does not initiate its next transmission 121 while the transmission 221 is being transmitted from the host. In general terms, defining a propagation delay as the time between the time of initiating a transmission and the time that the receiving device initiates an action based on the reception of the transmission, the fairness period should be at least twice the propagation delay between the peripheral device 100 and the host device 200.

In the example illustration of FIG. 2, the host device 200 transmits the transmission 311 at time 375, after detecting the end 373 of the transmission 301 from the peripheral device 100. After a propagation delay, at time 377, the activity detector 180 in the peripheral device 100 detects this transmission 311 and asserts the activity signal 181 illustrated as activity pulse 321 on timing diagram C. The transmission 311 ends at time 376, at which detection time 378, the activity detector 180 deasserts the activity signal 181.

As is common in the art, most protocols impose a slight delay time between transmissions, so that the end of one transmission is clearly distinguishable from the start of another. For completeness, in a preferred embodiment of this invention, the fairness timer 140 provides a pulse on the fairness signal 141 to effect this inter-transmission delay. The controller 190 communicates a timing request 194 to the fairness timer 140 to provide this short duration pulse. Note that in this embodiment, the controller 190 issues a different timing request 194, depending upon whether a fairness period or an inter-transmission period is required. In accordance with this invention, in a two station communications system as illustrated in FIG. 1, the fairness period is required after transmitting a transmission, and the inter-transmission period is required after receiving a transmission. The inter-transmission delay period is substantially less than the aforementioned fairness delay period 300, and is illustrated as pulse 332 that occurs at the end 378 of the activity pulse 321. Note that if the protocol does not require an inter-transmission delay, for example when the propagation delays provide an inherent gap between transmissions, the pulse 332 need not be provided.

In accordance with this invention, the controller 190 inhibits transmissions from the transmitter 120 of the peripheral device 100 whenever the fairness signal 141 or the activity signal 181 is asserted. FIG. 2 illustrates the resultant inhibit pulse 341 corresponding to the logical OR of the fairness pulse 331 after the end of the transmission 301, the activity pulse 321 during the transmission 311, and the inter-transmission pulse 332 after the end of the transmission 311. The peripheral transmitter 120 transmits the next transmission 302 when the inhibit pulse 341 is removed, at 379.

Illustrated at line F of FIG. 2, at the end 376 of transmission 311, the fairness timer 240 asserts a fairness pulse 352 in response to a fairness timing request 294 from the controller 290 in the host device 200. Similar to the controller 190 in the peripheral device 100, the controller 290 inhibits the host transmitter 220 from initiating a new transmission while this fairness pulse 352 is asserted. The fairness pulse 352 of the host fairness timer 240 is requested at the end of a transmission from the host device 200, and thus, in accordance with this invention, is equal to the fairness delay period 300. Because the inter-transmission pulse 332 is substantially shorter than the fairness delay period 300, the peripheral device 100 is assured of access to the single channel communication path 50 when it initiates the transmission 302 at time 379. Thus, as illustrated on line G of FIG. 2, transmission 302' from the peripheral device 100 is assured to be able to occur on the single channel communications path within a maximum latency period 390 from the prior transmission 301' from the peripheral device 100.

At the end of each received peripheral transmission 301', 302', 303', the host fairness timer 240 asserts a pulse 351, 353, 354 for the aforementioned inter-transmission delay period as discussed with regard to the pulse 332 of the peripheral fairness timer 140. As discussed above, if the protocol does not require an inter-transmission delay, the inter-transmission delay pulses 351, 353, 354 are eliminated.

At the end 381 of transmission 302, the peripheral fairness timer 140 provides another fairness pulse 333 equal in duration to the fairness period 300, and the transmitter 120 is inhibited 342 from transmitting, thereby allowing the host device 200 an opportunity to transmit again. In the example illustration of FIG. 2, the host device 200 does not transmit during this fairness period 300 after the end of transmission 302, and thus the activity detect signal 181 remains unasserted. Thus, at the end 382 of the fairness pulse 333, the controller 190 deasserts the inhibit pulse 342 and the transmitter 120 is allowed to send the transmission 303.

As can be seen, by allowing the transmitter 120 to transmit again after one fairness delay period 300, the throughput of the peripheral device 100 increases to take advantage of the lack of transmissions from the host device 200. Note also that the when both devices 100, 200 have transmissions to send, the throughput of the communications path 50 is limited only by the delay characteristic of the media and protocol. That is, during periods of maximum activity, the fairness periods provided by this invention have no effect on the capacity or performance of the single channel communications path 50, and optimal two way communications performance is provided to each device 100, 200.

Also note that once transmissions commence, subsequent transmissions will be virtually collision free. That is, if the host device 200 initiates each host transmission 221 at the end of each peripheral transmission 121 or at the end of a fairness period after a prior host transmission 221, and the peripheral device 100 initiates each peripheral transmission 121 at the end of each host transmission 221 or at the end of a fairness period after a prior peripheral transmission 121, collisions cannot occur. As would be evident to one of ordinary skill in the art, collision detection means should be provided to detect collisions when transmissions occur after a period of inactivity on the communications path 50. Collision detection means are common in the art, wherein each device monitors the communications path for a collision, and when a collision is detected, each device backs off and tries again, typically after a random interval of time. Co-pending U.S. patent application, "Arbitration Scheme for a Serial Interface", file number 09203634, filed Dec. 1, 1998 presents a method and device that allows one device to always win a collision, eliminating the need for collision detection means in that device, and is incorporated herein by reference. In a preferred embodiment of this invention, the peripheral device 100 is selected as the device that always wins a collision with the host device 200. In this embodiment, after a period of inactivity, the peripheral device need merely start transmitting whenever the host is not detected, without regard for collision, because it is guaranteed to win a collision if it should occur when the transmission starts, and thereafter guaranteed not to cause a collision, as discussed above. This continued transmission is particularly beneficial to devices that provide time dependent data, such as magnetic disk drives, magnetic tape drives, CD drives, video disc drives, and the like. In such devices, data is accessed only when the reading mechanism passes over the area of the media that contains the data. In these devices, by providing an assured continuous transmission once the transmission starts, the data read from the media can be transmitted directly, thereby minimizing the need for data buffers within the device. That is, if a read of data from the media commences when the single channel communications path 50 is clear, contiguous data elements on the media can be continuously transmitted as the read head passes over them, without concern for collision interference.

Assuming an equal packet size for transmissions from the host 200 and the peripheral 100, this uninterrupted transmission scenario also assures a throughput from the peripheral of at least one half the bandwidth of the communications path 50, less the overhead associated with this scenario, regardless of the likelihood of collisions. Once the transmissions commence, the throughput of the host device 200 is also one half the bandwidth of the communications path 50 less the overhead. That is, given the bandwidth of the communications path and the overhead associated with this protocol, the throughput of the devices can be determined. Because the throughput is substantially independent of collisions, and the maximum latency is limited, as discussed above, the ancillary components typically required of a device that sends information via a single channel communications path, such as buffers to contain data during the latency periods, can be of predetermined size. Because the throughput is substantially independent of collisions, the principles of this invention are particularly applicable to devices that require a guaranteed overall data throughput rate, such as video and audio devices, or computer networks that are used to communicate video and audio data for real time presentation.

As would be evident to one of ordinary skill in the art in light of this disclosure, the bandwidth can also be allocated disproportionately among the devices 100, 200. For example, the maximum size of the transmissions may be different for each device 100, 200. In this manner, although each device has an equal opportunity to gain access to the single channel path 50, one device will be able to transmit more information at each access than the other.

Figure 3:
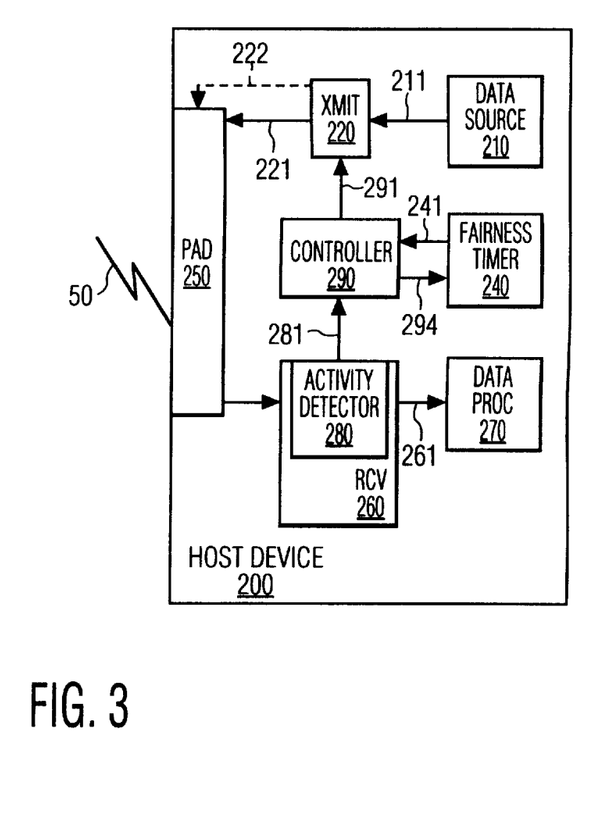
FIG. 3 illustrates an example block diagram of a multi-station communications system in accordance with this invention.
Figure 4:
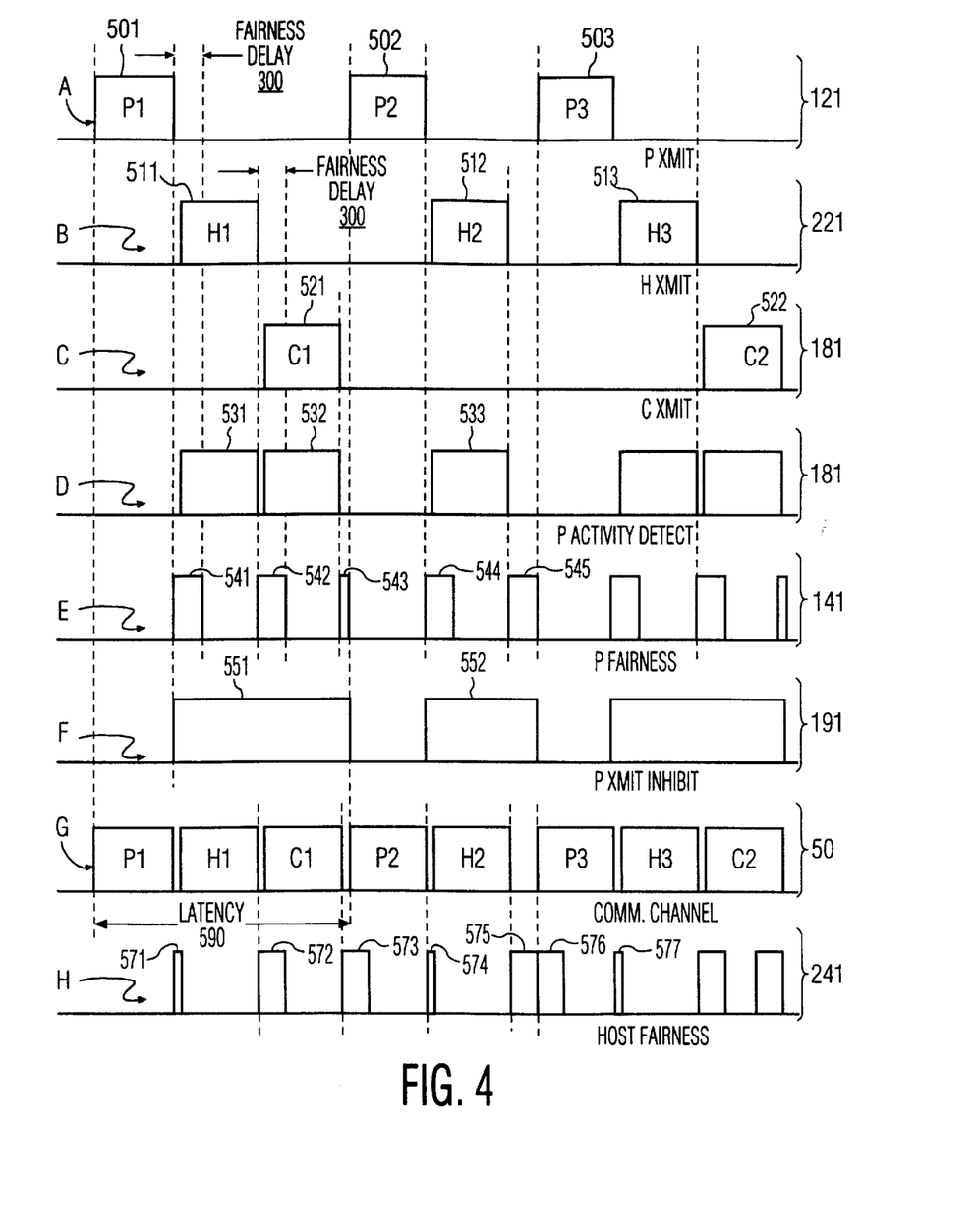
FIG. 4 illustrates example timing diagrams of a multi-station communications network in accordance with this invention.

The invention is applicable to multi-station communications networks as well. FIGS. 3 and 4 illustrate the application of this invention to a three-station communications network. Illustrated in FIG. 3 is a wireless communications path 50 among a peripheral device 100, host device 200, and another device C 400. The C device 400 is substantially similar to the peripheral device 100 and host device 200; for clarity, the transmitter 420, similar to transmitters 120, 220 in the peripheral and host devices, is shown in FIG. 3. In accordance with this invention, each device 100, 200, 400 operates similarly. In the two-station communications system, each device inhibits its transmission to allow the other device to transmit; in an N-station communications system, each device inhibits its transmission to allow the other N−1 devices to transmit.

FIG. 4 illustrates example timing diagrams for a three-station communication network. Timing diagrams A, B, C, D, E, F, G, and H correspond to signal nodes 121, 221, 421, 181, 141, 191, 50, and 241 of FIG. 3, respectively. For ease of understanding, minor propagation delays among the signals are not illustrated in FIG. 4. That is, for example, a delay between the initiation of transmission 501 on the node 121 and the presence of the signal 501' on the communications path 50 is not illustrated.

Illustrated in FIG. 4 is a transmission P1 501 from the peripheral transmitter 120. At the end of this transmission 501, the controller 190 initiates a fairness pulse 541 via the fairness timer 140, as in the two-station communications system and as illustrated in timing diagram E of FIG. 4. During this fairness interval 541, the host 200 initiates the transmission H1 511. At the end of transmission H1 511, the controller 290 of the host device 200 initiates a fairness pulse 572. Also at the end of this transmission H1 511, the controller 190 of the peripheral device 100 initiates another fairness pulse 542, because, in fairness, the remaining C device 400 should be given an opportunity to access the communications path 50. The C device 400 initiates a transmission C1 521 during these fairness intervals 542, 572.

At the end of the transmission C1 521, the host controller 290 initiates a second fairness pulse 573; not shown, the C device 400 also initiates a fairness pulse at the end of its transmission C1 521. The peripheral controller 190, having inhibited peripheral transmissions for two fairness intervals 541, 542, initiates a short inter-transmission delay 543, then allows the transmission P2 502. Note that in accordance with this invention, if the duration of each transmission 501, 511, 521, is limited, the peripheral device 100, as well as each other device, is provided access to the communications path 50 within a maximum latency delay 590. At the end of transmission P2 502, the peripheral controller 190 initiates a fairness pulse 544; not shown, the C device 400 also initiates a fairness pulse at the end of this transmission P2 502, allowing the host device 200 to initiate a transmission H2 512 after an inter-transmission delay 574. The peripheral device 100 and host device 100 each initiate a fairness pulse 545, 575, respectively, at the end of the transmission H2 512.

Note that while each transmission H1 511, C1 521, and H2 C512 occurs, the peripheral activity detector 180 signals this transmission activity at 531, 532, and 533, respectively. The combination of these activity pulses and the aforementioned fairness and delay pulses 541, 542, 543, 544, 545 provide the transmit-inhibit periods 551, 552. During the fairness interval 545, 575 after the end of the host transmission H2 512, the C device 400 in this example does not transmit. Thus, the activity detector 180 does not detect activity, and the transmit inhibit pulse 552 terminates with the end of the fairness pulse 545, and the transmitter 120 is permitted to transmit transmission P3 503. Note that at the end of the fairness pulse 575, the host device 200, having also detected no activity during this interval, initiates another fairness pulse 576 to allow the peripheral device 100 access to the communications path 50 for initiating the transmission P3 503 without the possibility of collision. Note also that, in accordance with this invention, the devices are able to increase their use of the communications path 50 when other devices underutilize the available throughput. At the end of transmission P3 503, the host device 200 initiates the transmission H3 513 after an inter-transmission delay 577, then the C device 400 initiates the transmission C2 522, and so on.

Each device in this three-station communications system continues to repeat the above two-fairness-intervals-between-transmissions scenario to allow each other equal access to the communications path 50. As would be evident to one of ordinary skill in the art in light of the above, in an N-station communications system, each device would provide N−1 fairness intervals between transmissions. As in the two-station communications system, once a sequence of transmissions begins, this fairness scenario also assures collision free access to the communications path 50, thereby maximizing the use of the available bandwidth of the communications path 50. Also as in the two-station communications system, conventional collision detection means can be employed to deal with possible collisions after periods of inactivity.

To effect the N−1 fairness interval scenario, each device in the N-station communications system must be able to determine N. In a straightforward embodiment, with a fixed N, each device can be provided a value of N directly, via, for example, switch settings or program commands. In a dynamic system wherein N may change, a variety of conventional network-forming scenarios may be employed. If the network has a control structure, such as one device being designated as the master controller and each other device. a slave, the master controller can inform each slave device of N as it admits devices onto the network. If the network lacks a central controller, each device is configured to dynamically determine N based on observed activity or collisions. In a preferred embodiment for a dynamic network, for example, each device initially assumes a two-station configuration, and continually monitors for collisions; if a collision occurs during a sequence of transmissions, the assumed number of stations is incremented. These and other network-forming techniques would be common to one of ordinary skill in the art.

Figure 5:
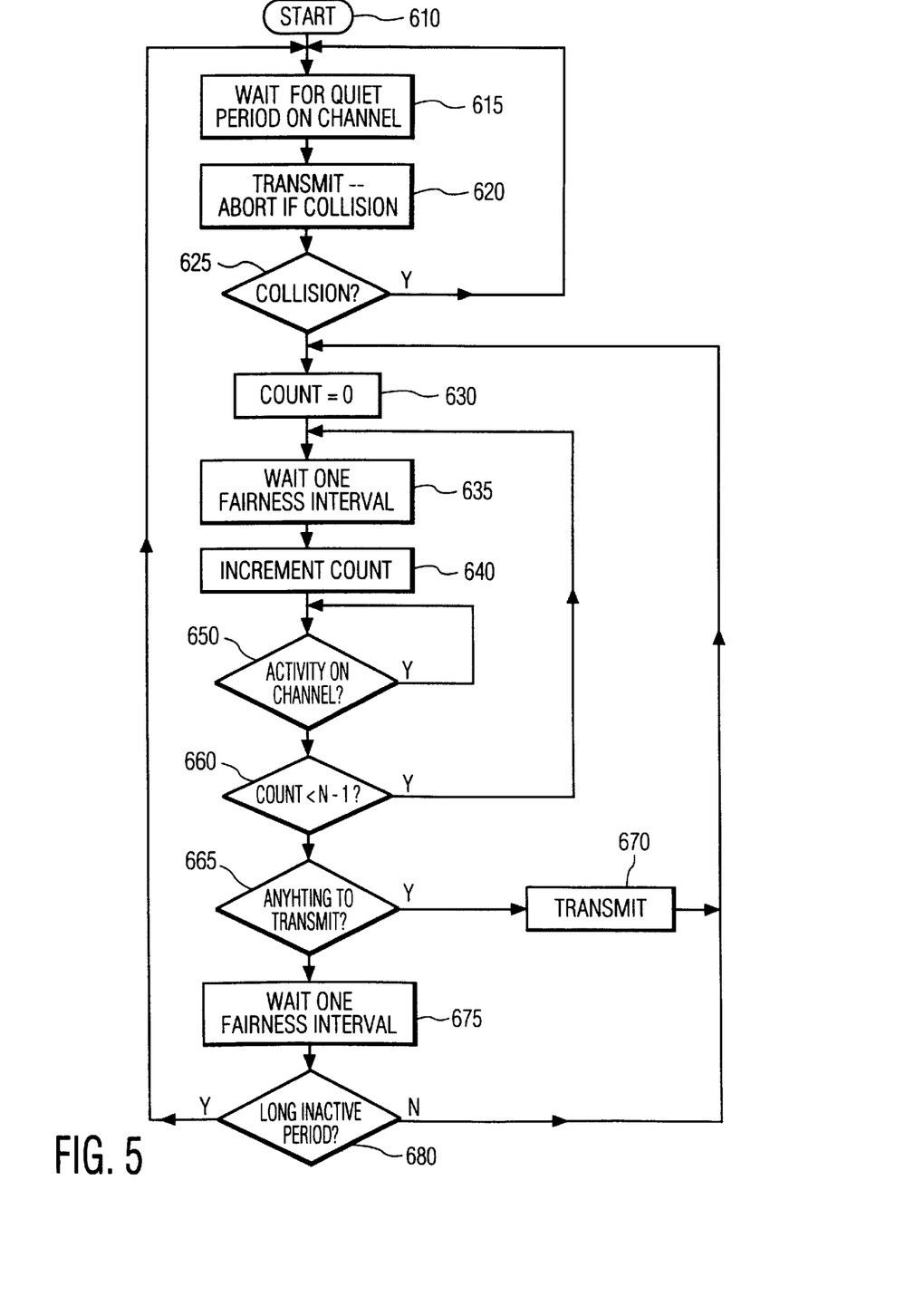
FIG. 5 illustrates an example flow diagram for a communications device in accordance with this invention.

FIG. 5 illustrates an example flow diagram for a communications device in an N-station communications system in accordance with this invention. The process starts at 610; this start corresponds to the initialization of the communications network, wherein each device typically transmits a sequence of initial messages to establish and verify the network. The device waits for a quiet period on the channel, at 615, before commencing a transmission, at 620. During this transmission, the device monitors for a possible collision with other devices that are initializing. If a collision occurs, the transmission is aborted, and the process 615–620 is repeated. In a preferred embodiment, when a collision occurs, each device attempts to transmit again after a random quiet period on the channel. In so doing, each device will eventually gain an initial access to the channel, from which each subsequent access is determined, as discussed herein.

After the first completed transmission without a collision, the device keeps track of accesses to the communications channel via a count indicator, which is initialized to zero at 630. The device waits for one fairness interval after the initial transmission, at 635, allowing the next device to transmit, and the count is incremented for this fairness interval, at 640. If there is activity from another device on the channel at the end of this fairness interval, the process loops, at 650 until the activity ceases. If N−1 fairness intervals have not yet been counted, at 660, the process loops back to wait another fairness interval, at 635, and increments the count, at 640. The 635-640-650-660 loop is repeated until the device has imposed N−1 fairness intervals. If, after the N−1 fairness intervals, at 665, the device has information to transmit, it is transmitted, at 670. The device then restarts the fairness interval counting process, at 630. If, at 665, the device does not have information to transmit, the device waits for another fairness interval in order to remain synchronized with the other devices that are waiting the fairness interval for this device to transmit. If, at 680, there has been recent activity on the communications channel, the device restarts the fairness interval counting process, at 630, and the process is continually repeated.

If, at 680, there has been a long period of inactivity, there will be a possibility that the devices on the network may be out of synchronization. The probability of lack of synchronization is primarily dependent upon the means used by each device to time each fairness interval. If each device is extremely accurate in this timing task, the inactive period can be extremely long before a risk of lack of synchronization occurs. If the devices have large variations in timings, synchronization may be lost within a few cycles of activity. When the device has something to send, and it is likely that a loss of synchronization may have occurred, at 680, the process is repeated from the initial start, at 615. In a preferred embodiment, the likelihood of loss of synchronization and the speed of reestablishing synchronization are reduced by having each transmission of each device in the network contain an identifier of the particular device. For example, in this preferred embodiment, each device is assigned a numeric identifier that is incremented when each device gains the initial access to the network. Thereafter, this numeric identifier is included with each transmission. In this manner, proper synchronization can be maintained, because each device can determine where its allocation is in the sequence of fairness timings. For example, the device with identifier 3 knows that it may transmit immediately after a transmission with identifier 2, or one fairness interval after a transmission with identifier 1, and so on. These and other synchronization techniques would be apparent to one of ordinary skill in the art. For example, to maintain continuous synchronization, each device in the network can be configured to transmit at each of its transmit opportunities. If a particular device has no information to transmit, the transmission can be a short burst; the burst need merely be long enough for the other devices to recognize as an activity, so that the end of the activity forces a new period for each fairness timer. Alternatively, assuming a moderate consistency of timing among devices, only one device need be configured to transmit at each of its transmit opportunities, thereby preventing the occurrence of a long periods of inactivity, and a continuous return to 630 at the decision block 680 of FIG. 5.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although the invention is particularly well suited for a single channel serial connection, the principles of this invention can be applied to one of a plurality of single channel connections that form a parallel connection. In another example, the principles presented herein can be applied to form a communications network with dynamic bandwidth allocation. When a device on the network requires substantially uninterrupted transmission access, for example, when providing a video or audio clip for immediate presentation, it can be programmed to transmit long duration transmissions, while others are programmed to transmit only short duration transmissions. At other times, other devices can be provided this longer duration transmission allocation.

The invention may be implemented in hardware, software, or a combination of both. For example, the controller 290 may be a program on a computer that interacts with a hardware transmitter 220 and receiver 260. The functional partitionings presented are for illustrative purposes only. For example, the fairness timer 240 may be integrated in the controller 290 or the transmitter 220; in like manner the timer 240, controller 290, and transmitter 220 may be integrated as a single unit. These and other configuration and optimization techniques would be evident to one of ordinary skill in the art, and within the scope of this invention.

I claim:

1. A communications device comprising:
   a transmitter configured to transmit a sequence of transmissions on a single channel communications path,
   a fairness timer configured to provide a fairness signal for a fairness duration after an end of a first transmission of the sequence of transmissions, and
   an activity detector configured to provide an activity signal in dependence upon a second transmission from a second communications device on the single channel communications path,
   wherein the transmitter transmits a subsequent transmission of the sequence of transmissions in dependence upon the fairness signal and the activity signal, and wherein the communications device does not include a collision detection means.

2. The communications device of claim 1, wherein a number of other devices communicate on the single channel communications path, and the transmitter transmits the subsequent transmission in further dependence upon the number of other devices.

3. The communications device of claim 1, wherein the fairness duration is dependent upon a transmission propagation delay between the transmitter and the second communications device.

4. The communications device of claim 1, wherein:
   the fairness timer is further configured to provide a delay signal for a duration after an end of the second transmission from the second communications device, and
   the transmitter transmits the subsequent transmission in further dependence upon the delay signal.

5. The communications device of claim 1, further comprising:
   a data source that is configured to provide data that is transmitted via the sequence of transmissions.

6. The communications device of claim 5, wherein the data source is at least one of: a magnetic tape device, a magnetic disk device, and a laser disc device.

7. The communications device of claim 1, wherein the sequence of transmissions include at least one of: a sequence of video data and a sequence of audio data.

8. The communications device of claim 1, further comprising:
   a data processor that is configured to process data that is communicated via the second transmission from the second communications device.

9. A communications system comprising:
   a first device that is configured to transmit a first sequence of transmissions on a single channel communications path, and
   a second device that is configured to transmit a second sequence of transmissions on the single channel communications path,
   wherein the first device is configured to transmit each transmission of the first sequence of transmissions after a first duration that is one of:
     a fairness duration after an end of a prior transmission of the first sequence of transmissions and
     a delay duration after an end of an other transmission of the second sequence of transmissions,
   wherein the first device transmits without regard for collisions.

10. The communications system of claim 9, wherein
    the second device is configured to transmit each transmission of the second sequence of transmissions after a second duration that is one of:
      the fairness duration after an end of a prior transmission of the second sequence of transmissions and
      the delay duration after an end of an other transmission of the first sequence of transmissions.

11. The communications system of claim 10, wherein
    the second device is a host computer, and
    the first device is a peripheral component of the host computer.

12. The communications system of claim 10, wherein
    the peripheral component is one of a magnetic tape device, a magnetic disc device, and a laser disc device.

13. The communications system of claim 9, wherein the first sequence of transmissions include at least one of: a sequence of video data and a sequence of audio data.

14. The communications system of claim 9, wherein
    the second device includes a collision detector that is configured to detect a collision between a first transmission of the first sequence of transmissions and a second transmission of the second sequence of transmissions, and wherein
    the second device terminates the second transmission whenever the collision is detected, and the first device continues the first transmission independent of the collision.

15. A method for controlling data flow from a communications device, comprising the steps of:
    transmitting a first transmission on a single channel communications path from the communications device,
    asserting a fairness signal for a fairness duration,
    monitoring the single channel communications path for a second communications device during the fairness duration and asserting an activity signal whenever the second transmission is detected,
    transmitting a subsequent transmission on the signal channel communications path from the communications device in dependence upon the fairness signal and the activity signal, wherein the communications device does not include collision detection means.

* * * * *